United States Patent
Cheng et al.

(10) Patent No.: US 10,462,770 B2
(45) Date of Patent: *Oct. 29, 2019

(54) METHOD FOR TRANSMITTING UPLINK CONTROL INFORMATION, USER EQUIPMENT AND BASE STATION

(71) Applicant: Huawei Technologies Co., Ltd., Shenzhen (CN)

(72) Inventors: Yan Cheng, Beijing (CN); Yongxia Lv, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,695

(22) Filed: May 10, 2018

(65) Prior Publication Data

US 2018/0263031 A1 Sep. 13, 2018

Related U.S. Application Data

(63) Continuation of application No. 14/330,918, filed on Jul. 14, 2014, now Pat. No. 9,980,255, which is a
(Continued)

(30) Foreign Application Priority Data

Jan. 12, 2012 (CN) .......................... 2012 1 0008637

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0029* (2013.01); *H04L 1/1854* (2013.01);
(Continued)

(58) Field of Classification Search
CPC ... H04L 1/0029; H04L 1/1812; H04L 1/1854; H04W 28/06; H04W 72/0413; H04W 72/042

See application file for complete search history.

(56) References Cited

U.S. PATENT DOCUMENTS

| 9,413,509 B2 | 8/2016 | Chen et al. |
| 2010/0232382 A1* | 9/2010 | Gauvreau ............. H04W 72/02 370/329 |

(Continued)

FOREIGN PATENT DOCUMENTS

| CN | 101695017 A | 4/2010 |
| CN | 101984568 A | 3/2011 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.2.0, Jun. 2011, 120 pages.
(Continued)

*Primary Examiner* — Dung B Huynh
(74) *Attorney, Agent, or Firm* — Leydig, Voit & Mayer, Ltd.

(57) ABSTRACT

The present application discloses a method for transmitting uplink control information, a user equipment, and a base station. The method includes: receiving a physical downlink control channel sent by a base station, where the physical downlink control channel includes indication information, where the indication information is used to indicate a physical uplink control channel resource used to transmit uplink control information; obtaining, according to the indication information and whether the uplink control information includes periodic channel state information, a physical uplink control channel resource used to transmit the uplink
(Continued)

control information from a semi-statically configured first resource group and/or second resource group; and sending the uplink control information to the base station over a physical uplink control channel corresponding to the physical uplink control channel resource.

10 Claims, 5 Drawing Sheets

Related U.S. Application Data continuation of application No. PCT/CN2013/070360, filed on Jan. 11, 2013.

(51) Int. Cl.
*H04L 1/18* (2006.01)
*H04W 28/06* (2009.01)
(52) U.S. Cl.
CPC ......... *H04W 72/042* (2013.01); *H04L 1/1812* (2013.01); *H04W 28/06* (2013.01)

(56) References Cited

U.S. PATENT DOCUMENTS

| | | | |
|---|---|---|---|
| 2010/0246512 A1* | 9/2010 | Kawamura | H04L 1/0026 370/329 |
| 2010/0272019 A1 | 10/2010 | Papasakellariou et al. | |
| 2010/0311431 A1 | 12/2010 | Papasakellariou et al. | |
| 2011/0235602 A1* | 9/2011 | Ji | H04L 5/0007 370/329 |
| 2011/0243066 A1* | 10/2011 | Nayeb Nazar | H04L 1/007 370/328 |
| 2011/0310759 A1 | 12/2011 | Gerstenberger et al. | |
| 2012/0039252 A1 | 2/2012 | Damnjanovic et al. | |
| 2012/0039279 A1 | 2/2012 | Chen et al. | |
| 2012/0039280 A1 | 2/2012 | Chen et al. | |
| 2012/0082157 A1 | 4/2012 | Yamada et al. | |
| 2012/0120817 A1 | 5/2012 | Khoshnevis et al. | |
| 2012/0155413 A1 | 6/2012 | Liu et al. | |
| 2012/0201212 A1 | 8/2012 | Xia et al. | |
| 2012/0257513 A1* | 10/2012 | Yamada | H04L 1/0618 370/248 |
| 2012/0314613 A1* | 12/2012 | Zhang | H04B 7/0486 370/252 |
| 2013/0039296 A1 | 2/2013 | Damnjanovic et al. | |
| 2013/0044653 A1 | 2/2013 | Yang et al. | |
| 2013/0083741 A1* | 4/2013 | Larsson | H04L 5/0094 370/329 |
| 2013/0083742 A1* | 4/2013 | Baldemair | H04L 1/003 370/329 |
| 2013/0083748 A1* | 4/2013 | Li | H04L 5/14 370/329 |
| 2013/0083753 A1 | 4/2013 | Lee et al. | |
| 2013/0100911 A1 | 4/2013 | Lv et al. | |
| 2013/0114556 A1* | 5/2013 | Yang | H04L 1/0027 370/329 |
| 2013/0117622 A1 | 5/2013 | Blankenship et al. | |
| 2013/0121270 A1* | 5/2013 | Chen | H04L 5/001 370/329 |
| 2013/0121302 A1 | 5/2013 | Yang et al. | |
| 2013/0176952 A1 | 7/2013 | Shin et al. | |
| 2013/0195063 A1 | 8/2013 | Ahn et al. | |
| 2013/0215807 A1* | 8/2013 | Yang | H04L 1/0026 370/281 |
| 2013/0322307 A1* | 12/2013 | Yang | H04L 1/1854 370/280 |
| 2013/0343322 A1 | 12/2013 | Lee et al. | |
| 2014/0169319 A1* | 6/2014 | Yang | H04W 72/0413 370/329 |
| 2014/0219238 A1* | 8/2014 | Park | H04B 7/024 370/330 |
| 2014/0233523 A1 | 8/2014 | Jang et al. | |
| 2014/0307631 A1* | 10/2014 | Miao | H04L 1/0015 370/328 |
| 2014/0362792 A1 | 12/2014 | Cheng et al. | |

FOREIGN PATENT DOCUMENTS

| | | | | |
|---|---|---|---|---|
| CN | 101986591 A | 3/2011 | | |
| CN | 102045144 A | 5/2011 | | |
| CN | 102255694 A | 11/2011 | | |
| CN | 102281133 A | 12/2011 | | |
| CN | 103209483 A | 7/2013 | | |
| WO | 2010123304 A2 | 10/2010 | | |
| WO | 2010140826 A2 | 12/2010 | | |
| WO | WO-2013051982 A1 * | 4/2013 | | H04L 1/1671 |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 125 pages.

* cited by examiner

METHOD FOR TRANSMITTING UPLINK CONTROL INFORMATION, USER EQUIPMENT AND BASE STATION

CROSS-REFERENCE TO RELATED APPLICATION

This application is a continuation of U.S. patent application Ser. No. 14/330,918 filed on Jul. 14, 2014, which is a continuation of International Application No. PCT/CN2013/070360 filed on Jan. 11, 2013, which claims priority to Chinese Patent Application No. 201210008637.6 filed on Jan. 12, 2012. All of the afore-mentioned patent applications are hereby incorporated by reference in their entireties.

TECHNICAL FIELD

The present application relates to the communications field, and in particular, to a method for transmitting uplink control information, a user equipment, and a base station in the communications field.

BACKGROUND

A Long Term Evolution-Advanced (Long Term Evolution-Advanced, LTE-A for short) system is a further evolved and enhanced system based on a 3rd Generation Partnership Project (3rd Generation Partnership Project, 3GPP for short) Long Term Evolution (Long Term Evolution, LTE for short) system. In the LTE-A system, to meet the peak data rate required by the International Telecommunications Union for the fourth-generation communications technologies, a carrier aggregation (Carrier Aggregation, CA for short) technology is introduced, which is also referred to as a spectrum aggregation (Spectrum Aggregation) technology or bandwidth extension (Bandwidth Extension) technology. In carrier aggregation, spectra of two or more component carriers (Component Carrier) are aggregated to obtain a wider transmission bandwidth. The spectra of component carriers may be adjacent continuous spectra or nonadjacent spectra in the same band, or even discontinuous spectra in different bands. In an LTE Release 8 or 9 (Release-8/9, Rel-8/9 for short) system, a user equipment (User Equipment, UE for short) can access only one of the component carriers to receive or transmit data; in an LTE-A system, however, a user equipment can access multiple component carriers simultaneously according to its capabilities and service requirements to receive or transmit data.

To support dynamic scheduling, downlink multiple input multiple output (Multiple Input Multiple Output, MIMO for short) transmission, hybrid automatic repeat request and other technologies, the user equipment needs to feed back uplink control information (Uplink Control Information, UCI for short) to a base station. The uplink control information UCI may include channel state information (Channel State Information, CSI for short) and hybrid automatic repeat request acknowledgment (Hybrid Automatic Repeat Request-Acknowledgment, HARQ-ACK for short) information. The hybrid automatic repeat request acknowledgment information may be referred to briefly as acknowledgment (Acknowledgment, ACK for short)/negative acknowledgement (Negative Acknowledgment, NACK for short) information.

In LTE-A, due to introduction of the carrier aggregation technology, when a user equipment accesses multiple downlink component carriers simultaneously to receive downlink data, the user equipment needs to feed back its channel state information CSI in the uplink direction for each downlink component carrier, and also needs to feed back its hybrid automatic repeat request acknowledgment information HARQ-ACK in the uplink direction for data scheduled on each downlink component carrier. On the one hand, the user equipment generally needs to determine the reporting time of periodic CSI of each carrier according to the reporting period and the subframe offset of each carrier configured by high layer signaling. On the other hand, the user equipment needs to feed back hybrid automatic repeat request acknowledgment information HARQ-ACK when detecting a physical downlink shared channel (Physical Downlink Shared Channel, PDSCH for short) or a physical downlink control channel (Physical Downlink Control Channel, PDCCH for short) indicative of semi-persistent scheduling release (Semi-persistent Scheduling Release, SPS for short). Therefore, in an LTE-A carrier aggregation scenario, the user equipment needs to report both channel state information and hybrid automatic repeat request acknowledgment information in one uplink subframe. The channel state information to be reported may correspond to one or more downlink carriers, and the hybrid automatic repeat request acknowledgment information to be reported may also correspond to one or more downlink carriers.

In a current LTE carrier aggregation system, when only periodic CSI needs to be transmitted, a physical uplink control channel (Physical Uplink Control Channel, PUCCH for short) of format 2 (Format 2) may be used for transmission. When only hybrid automatic repeat request acknowledgment information HARQ-ACK needs to be transmitted, a PUCCH of format 1a or format 1b or format 3 may be used for transmission. However, when both the periodic CSI and the hybrid automatic repeat request acknowledgment information HARQ-ACK need to be transmitted in one subframe, in most cases, the periodic CSI is discarded, and only the hybrid automatic repeat request acknowledgment information HARQ-ACK is transmitted.

In the carrier aggregation system, to support simultaneous transmission of the periodic CSI and the hybrid automatic repeat request acknowledgment information HARQ-ACK, the user equipment may obtain a PUCCH of format 3 according to high layer signaling indicated semi-statically, to transmit the periodic CSI and the HARQ-ACK. However, in the foregoing method, once a PUCCH resource of format 3, which is reserved semi-statically, is assigned to a UE, the resource is occupied by the UE no matter whether the UE needs to transmit the periodic CSI and the HARQ-ACK simultaneously, which leads to high resource overhead used to transmit uplink control information and leads to low resource utilization.

SUMMARY

Embodiments of the present application provide a method for transmitting uplink control information, a user equipment, and a base station, which can transmit uplink control information, reduce resource overhead caused by uplink control information transmission to a physical uplink control channel, and improve resource utilization.

In one aspect, an embodiment of the present application provides a method for transmitting uplink control information, including: receiving a physical downlink control channel sent by a base station, where the physical downlink control channel includes indication information, where the indication information is used to indicate a physical uplink control channel resource used to transmit uplink control information; obtaining, according to the indication information and whether the uplink control information includes periodic channel state information, the physical uplink control channel resource used to transmit the uplink control information from a semi-statically configured first resource group and/or second resource group, where a maximum number of information bits supported by physical uplink control channels corresponding to resources included in the first resource group is greater than a maximum number of information bits supported by physical uplink control channels corresponding to resources included in the second resource group; and sending the uplink control information to the base station over a physical uplink control channel corresponding to the physical uplink control channel resource.

In another aspect, an embodiment of the present application provides a method for transmitting uplink control information, including: sending a physical downlink control channel to a user equipment, where the physical downlink control channel includes indication information, where the indication information is used to indicate a physical uplink control channel resource used to transmit uplink control information; obtaining, according to the indication information and whether the uplink control information includes periodic channel state information, the physical uplink control channel resource used to transmit the uplink control information from a first resource group and/or a second resource group configured semi-statically for the user equipment, where a maximum number of information bits supported by physical uplink control channels corresponding to resources included in the first resource group is greater than a maximum number of information bits supported by physical uplink control channels corresponding to resources included in the second resource group; and receiving, over a physical uplink control channel corresponding to the physical uplink control channel resource, the uplink control information sent by the user equipment.

In still another aspect, an embodiment of the present application provides a user equipment, including: a receiving module, configured to receive a physical downlink control channel sent by a base station, where the physical downlink control channel includes indication information, where the indication information is used to indicate a physical uplink control channel resource used to transmit uplink control information; an obtaining module, configured to obtain, according to the indication information received by the receiving module and whether the uplink control information includes periodic channel state information, the physical uplink control channel resource used to transmit the uplink control information from a semi-statically configured first resource group and/or second resource group, where a maximum number of information bits supported by physical uplink control channels corresponding to resources included in the first resource group is greater than a maximum number of information bits supported by physical uplink control channels corresponding to resources included in the second resource group; and a sending module, configured to send the uplink control information to the base station over a physical uplink control channel corresponding to the physical uplink control channel resource obtained by the obtaining module.

In yet another aspect, an embodiment of the present application provides a base station, including: a sending module, configured to send a physical downlink control channel to a user equipment, where the physical downlink control channel includes indication information, where the indication information is used to indicate a physical uplink control channel resource used to transmit uplink control information; an obtaining module, configured to obtain, according to the indication information sent by the sending module and whether the uplink control information includes periodic channel state information, the physical uplink control channel resource used to transmit the uplink control information from a first resource group and/or a second resource group configured semi-statically for the user equipment, where a maximum number of information bits supported by physical uplink control channels corresponding to resources included in the first resource group is greater than a maximum number of information bits supported by physical uplink control channels corresponding to resources included in the second resource group; and a receiving module, configured to receive, over a physical uplink control channel corresponding to the physical uplink control channel resource obtained by the obtaining module, the uplink control information sent by the user equipment.

Based on the foregoing technical solutions, by using the method for transmitting uplink control information, the user equipment, and the base station in the embodiments of the present application, a physical uplink control channel resource used to transmit uplink control information is obtained from a semi-statically configured resource group according to indication information included in a physical downlink control channel and whether the uplink control information to be transmitted includes periodic channel state information. In this way, the uplink control information can be transmitted, the resource overhead caused by uplink control information transmission to the physical uplink control channel can be reduced, and the resource utilization can be improved.

BRIEF DESCRIPTION OF THE DRAWINGS

To illustrate the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

It should be understood that the technical solutions in the embodiments of the present application are applicable to various communications systems, for example, a Global System of Mobile Communications (Global System of Mobile Communication, GSM for short) system, a Code Division Multiple Access (Code Division Multiple Access, CDMA for short) system, a Wideband Code Division Multiple Access (Wideband Code Division Multiple Access, WCDMA for short) system, a General Packet Radio Service (General Packet Radio Service, GPRS for short) system, a Long Term Evolution (Long Term Evolution, LTE for short) system, an LTE Frequency Division Duplex (Frequency Division Duplex, FDD for short) system, an LTE Time Division Duplex (Time Division Duplex, TDD for short) system, a Universal Mobile Telecommunication System (Universal Mobile Telecommunication System, UMTS for short), and a Worldwide Interoperability for Microwave Access (Worldwide Interoperability for Microwave Access, WiMAX for short) communications system.

It should also be understood that a user equipment (User Equipment, UE for short) in the embodiments of the present application may be referred to as a terminal (Terminal), a mobile station (Mobile Station, MS for short), a mobile terminal (Mobile Terminal), or the like; and the user equipment can communicate with one or more core networks over a radio access network (Radio Access Network, RAN for short). For example, the user equipment may be a mobile phone (or referred to as a "cellular" phone), or a computer with a mobile terminal, and for example, may be a mobile device that is portable, pocket-sized, handheld, computer-embedded, or vehicle-mounted, which exchanges voice and/or data with the radio access network.

In the embodiments of the present application, a base station may be a base station (Base Transceiver Station, BTS for short) in a GSM or CDMA system, or a base station (NodeB, NB for short) in a WCDMA system, or an evolved base station (evolved NodeB, eNB or e-NodeB for short) in an LTE system, which is not limited in the present application. However, for ease of description, the following embodiments are described by using a base station eNB and a user equipment UE as examples.

Figure 1:
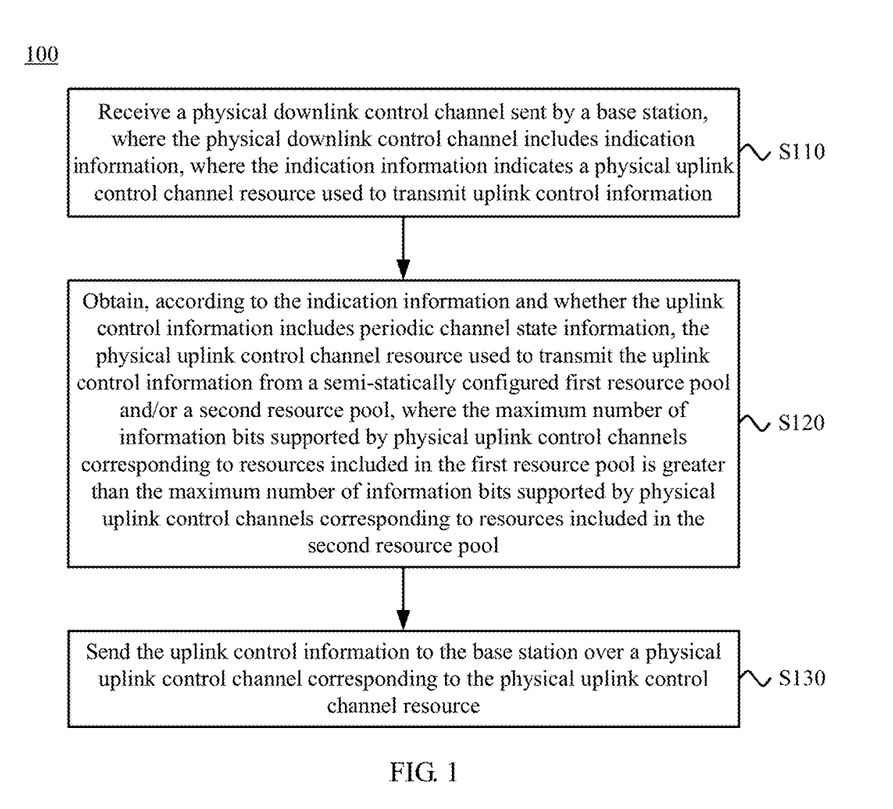
FIG. 1 is a schematic flowchart of a method for transmitting uplink control information according to an embodiment of the present application.

FIG. 1 is a schematic flowchart of a method 100 for transmitting uplink control information according to an embodiment of the present application. As shown in FIG. 1, the method 100 includes:

S110. Receive a physical downlink control channel sent by a base station, where the physical downlink control channel includes indication information, where the indication information is used to indicate a physical uplink control channel resource used to transmit uplink control information.

S120. Obtain, according to the indication information and whether the uplink control information includes periodic channel state information, the physical uplink control channel resource used to transmit the uplink control information from a semi-statically configured first resource group and/or second resource group, where a maximum number of information bits supported by physical uplink control channels corresponding to resources included in the first resource group is greater than a maximum number of information bits supported by physical uplink control channels corresponding to resources included in the second resource group.

S130. Send the uplink control information to the base station over a physical uplink control channel corresponding to the physical uplink control channel resource.

To transmit uplink control information, save resource overhead, and improve resource utilization, the user equipment may receive the indication information that is sent by the base station over a physical downlink control channel, where the indication information indicates the physical uplink control channel resource used to transmit uplink control information. Therefore, on the one hand, the user equipment may determine, according to whether the uplink control information to be transmitted includes periodic channel state information, whether to use a physical uplink control channel resource group whose maximum number of supported information bits is greater or a physical uplink control channel resource group whose maximum number of supported information bits is smaller in the semi-statically configured first resource group and/or second resource group, to transmit the uplink control information; on the other hand, the user equipment may further determine, according to the indication information sent by the base station, the specific resource used to transmit the uplink control information from the determined resource group, and send the uplink control information to the base station over the corresponding physical uplink control channel.

That is, in the embodiment of the present application, the first resource group and/or the second resource group are configured semi-statically by using high layer signaling, and then the specific physical uplink control channel resource to be used is indicated dynamically by PDCCH signaling. In this way, multiple user equipments can use the semi-statically configured physical uplink control channel resource in a statistical multiplexing manner, which avoids resource waste, reduces resource overhead, and improves resource utilization.

Therefore, in the method for transmitting uplink control information in the embodiment of the present application, a physical uplink control channel resource used to transmit uplink control information is obtained from a semi-statically configured resource group according to indication information included in a physical downlink control channel and whether the uplink control information to be transmitted includes periodic channel state information. In this way, the uplink control information can be transmitted, the resource overhead caused by uplink control information transmission to the physical uplink control channel can be reduced, and the resource utilization can be improved.

It should be understood that the embodiment of the present application is applicable to various carrier aggregation systems or carrier aggregation scenarios. For ease of description, the embodiment of the present application takes only a carrier aggregation scenario of an LTE-A system as an example for description, but the embodiment of the present application is not limited thereto.

Further, it should be understood that, in the embodiment of the present application, the term "and/or" is merely an association relationship for describing associated objects, and indicates three possible relationships. For example, A and/or B may indicate the following three cases: A exists alone, both A and B exist, and B exists alone. In addition, the symbol "/" herein generally means that associated objects before and after the symbol are in an "or" relationship.

In S110, the user equipment UE receives a physical downlink control channel PDCCH sent by the base station ENB, where the PDCCH includes indication information, where the indication information is used to indicate a physical uplink control channel PUCCH resource used to transmit uplink control information UCI. That is, the UE detects the PDCCH, and a downlink control information format (DCI Format) corresponding to the PDCCH includes a field indicative of the PUCCH resource used to transmit the UCI.

Optionally, the UE receives the PDCCH sent by the ENB, and a transmit power control (Transmit Power Control, TPC for short) field (or referred to as a transmit power control command field) of the PDCCH carries the indication information. Specifically, the TPC field in the downlink control information (DCI for short) format corresponding to the PDCCH carries the indication information. It should be understood that, in the embodiment of the present application, other fields in the DCI format may also be used to carry the indication information. The present application is not limited thereto.

In the embodiment of the present application, the uplink control information UCI to be transmitted may include at least one of periodic channel state information CSI, hybrid automatic repeat request acknowledgment information HARQ-ACK, and a scheduling request (Scheduling Request, SR for short). For example, the UCI to be transmitted includes only the HARQ-ACK, or includes only the periodic CSI, or includes both the periodic CSI and the HARQ-ACK, or includes the periodic CSI, the HARQ-ACK, and the SR. The present application is not limited thereto.

In S120, the UE obtains, according to the indication information and whether the uplink control information UCI includes periodic channel state information CSI, a physical uplink control channel PUCCH resource used to transmit the uplink control information UCI from a semi-statically configured first resource group and/or second resource group.

Optionally, the resources included in the first resource group are physical uplink control channel format 3 resources; or the resources included in the second resource group are physical uplink control channel format 1b resources. That is, the first resource group may be formed by PUCCH resources of Format 3, and the second resource group may be formed by PUCCH resources of Format 1b.

It should be understood that the second resource group may also be formed by PUCCH resources of Format 3, and, in this case, the first resource group may be formed by PUCCH resources whose maximum number of supported information bits is greater than the maximum number of information bits supported by the PUCCH of Format 3. Further, it should be understood that the first resource group and the second resource group may also be formed by PUCCH resources of other formats. The embodiment of the present application is not limited thereto.

In the embodiment of the present application, according to the specific content of the UCI to be transmitted, the UE may determine to select a resource from the first resource group or the second resource group to transmit the UCI. For example, according to whether the UCI includes periodic CSI, the UE may obtain, from a semi-statically configured first resource group and/or second resource group, a physical uplink control channel resource used to transmit the uplink control information.

Figure 2:
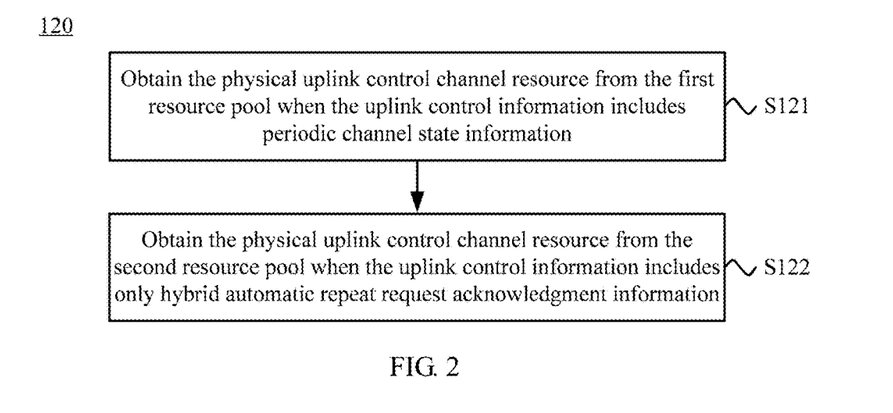
FIG. 2 is a schematic flowchart of a method for obtaining a physical uplink control channel resource according to an embodiment of the present application.

Optionally, in a method 120 for obtaining a physical uplink control channel resource illustrated in FIG. 2, the obtaining a physical uplink control channel resource used to transmit the uplink control information from a semi-statically configured first resource group and/or second resource group includes: S121: Obtain the physical uplink control channel resource from the first resource group when the uplink control information includes periodic channel state information.

For example, when the UCI to be transmitted includes only periodic CSI, the UE may obtain, from the first resource group, the PUCCH resource used to transmit the UCI. For another example, when the UCI to be transmitted includes periodic CSI and HARQ-ACK, or when the UCI to be transmitted includes periodic CSI, HARQ-ACK, and an SR, the UE may obtain, from the first resource group, the PUCCH resource used to transmit the UCI. Definitely, when the UCI to be transmitted includes the periodic CSI and the SR, the UE may also obtain, from the first resource group, the PUCCH resource used to transmit the UCI.

Specifically, for example, when the uplink control information UCI to be transmitted includes periodic channel state information CSI, the UCI may be transmitted by using a physical uplink control channel PUCCH of Format 3.

Optionally, in the method 120 illustrated in FIG. 2, the obtaining a physical uplink control channel resource used to transmit the uplink control information from a semi-statically configured first resource group and/or second resource group includes: S122: Obtain the physical uplink control channel resource from the second resource group when the uplink control information includes only hybrid automatic repeat request acknowledgment information.

That is, in an embodiment of the present application, when the UCI to be transmitted includes no periodic CSI, but includes only HARQ-ACK, the UE may obtain, from the second resource group, the PUCCH resource used to transmit the UCI. For example, when the uplink control information UCI to be transmitted includes only the HARQ-ACK, the UCI may be transmitted by using a physical uplink control channel PUCCH of Format 1b.

It should be understood that, when the UCI to be transmitted includes no periodic CSI, the UE may obtain, from the second resource group, the PUCCH resource used to transmit the UCI. For example, when the UCI to be transmitted includes the HARQ-ACK and the SR, the UE may obtain, from the second resource group, the PUCCH resource used to transmit the UCI.

In the embodiment of the present application, both the PUCCH resources in the first resource group and the PUCCH resources in the second resource group may be preset semi-statically by using high layer signaling, and the PUCCH resources in the first resource group and the PUCCH resources in the second resource group may be used by multiple user equipments in a statistical multiplexing manner. That is, the same physical uplink control channel resources in the first resource group and/or the second resource group may be configured semi-statically for multiple user equipments by using high layer signaling. In the multiple user equipments, not all user equipments need to use the PUCCH resource at the same time. Therefore, the number of user equipments may be greater than the number of resources in the group, and the multiple user equipments can use the resources in the group in a statistical multiplexing manner. Therefore, in the embodiment of the present application, resources in the first resource group and/or the second resource group are configured semi-statically by using high layer signaling, and then the specific physical uplink control channel resource to be used by each user equipment is indicated dynamically by a PDCCH. In this way, multiple user equipments can use the semi-statically configured physical uplink control channel resources in a statistical multiplexing manner, thereby improving resource utilization.

In S130, the user equipment sends the uplink control information to the base station over a physical uplink control channel corresponding to the obtained physical uplink control channel resource. For example, when the uplink control information to be transmitted is periodic CSI and hybrid automatic repeat request acknowledgment information HARQ-ACK, the user equipment may obtain a resource index of a PUCCH of Format 3 in S120. According to the resource index, the user equipment may obtain an orthogonal sequence, a cyclic shift, and physical resource block (Physical Resource Block, PRB for short) positions of the PUCCH of Format 3, and therefore, the user equipment can transmit the periodic CSI and the hybrid automatic repeat request acknowledgment information to the base station according to the obtained orthogonal sequence, reference channel cyclic shift, and PRB positions.

Therefore, in the method for transmitting uplink control information in the embodiment of the present application, a physical uplink control channel resource used to transmit uplink control information is obtained from a semi-statically configured resource group according to indication information included in a physical downlink control channel and whether the uplink control information to be transmitted includes periodic channel state information. In this way, the uplink control information can be transmitted, the resource overhead caused by uplink control information transmission to the physical uplink control channel can be reduced, and the resource utilization can be improved.

It should be noted that, in the embodiment of the present application, the user equipment determines, according to whether the uplink control information to be transmitted includes the periodic CSI, whether the field indicative of a physical uplink control channel resource in the DCI Format specifically indicates a PUCCH resource in the first resource group or a PUCCH resource in the second resource group. It may be understood as: when the uplink control information to be transmitted includes periodic CSI, the physical uplink control channel resource indicated by the field comes from the first resource group; and when the uplink control information to be transmitted includes only hybrid automatic repeat request acknowledgment information, the physical uplink control channel resource indicated by the field comes from the second resource group. Alternatively, it may also be understood as: when the physical uplink control channel indicated by the field is used to transmit uplink control information over an uplink subframe which is configured by a higher layer and used to transmit the periodic CSI, the physical uplink control channel resource indicated by the field comes from the first resource group; otherwise, the physical uplink control channel resource indicated by the field comes from the second resource group.

In the embodiment of the present application, the first resource group may refer to a resource group that includes one or more first physical uplink control channel resources. Similarly, the second resource group may refer to a resource group that includes one or more second physical uplink control channel resources, where the maximum number of information bits supported by a first physical uplink control channel is greater than the maximum number of information bits supported by a second physical uplink control channel. A first physical uplink control channel resource in the first resource group may be a PUCCH Format 3 resource; when the second physical uplink control channel resources in the second resource group are used to transmit only hybrid automatic repeat request acknowledgment information, the second physical uplink control channel resources may all be PUCCH Format 1b resources, or PUCCH Format 3 resources, and, preferably in the present application, all are PUCCH Format 1b resources. It should be noted that, when all the second physical uplink control channel resources in the second resource group are PUCCH Format 3 resources, in a subframe which is semi-statically configured by the higher-layer signaling and used to transmit a scheduling request, the resources in the second resource group may also be used to transmit hybrid automatic repeat request acknowledgment information and scheduling requests SR.

It should be understood that the field indicative of a physical uplink control channel resource in the DCI Format may also indicate only a physical uplink control channel resource in the first resource group. That is, the field is used to indicate a physical uplink control channel resource only when the uplink control information to be transmitted includes periodic CSI; and, when the uplink control information to be transmitted includes only hybrid automatic repeat request acknowledgment information, the field may not be used to indicate a physical uplink control channel resource. For example, when the PDCCH is transmitted over a downlink primary carrier (or referred to as a primary cell Primary Cell), the field indicative of a physical uplink control channel resource in the DCI Format corresponding to the PDCCH is used to indicate a physical uplink control channel resource only when the uplink control information to be transmitted includes periodic CSI.

In the embodiment of the present application, first, the user equipment determines, according to the uplink control information to be transmitted, a resource group that includes the physical uplink control channel indicated by a field in the DCI Format, where the field is used to indicate a physical uplink control channel resource. For example, when the UCI includes periodic CSI and hybrid automatic repeat request acknowledgment information HARQ-ACK, it is determined that the physical uplink control channel belongs to the first resource group; and when the UCI includes only the hybrid automatic repeat request acknowledgment information, it is determined that the physical uplink control channel belongs to the second resource group. Then, according to the value of the field indicative of a physical uplink control channel resource, the user equipment may determine, in the corresponding resource group, the physical uplink control channel resource used to transmit the UCI.

The embodiment of the present application does not limit the field indicative of a physical uplink control channel resource in the DCI Format. For example, the field may be a transmit power control field (TPC Field) in the DCI Format. The embodiment of the present application does not limit the specific method by which the physical uplink control channel resource is obtained according to the value of the field indicative of a physical uplink control channel resource and the uplink control information. The following describes an implementation manner of obtaining a PUCCH resource in further detail through an example where the field indicative of a physical uplink control channel resource is a TPC field.

If the uplink control information to be transmitted is periodic CSI and hybrid automatic repeat request acknowledgment information, or is periodic CSI, hybrid automatic repeat request acknowledgment information HARQ-ACK and a scheduling request SR, the user equipment may obtain, according to a mapping between values of the TPC field and PUCCH resources shown in Table 1, a physical uplink control channel resource used to transmit the uplink control information, where $n_{PUCCH}^{(3,p)}$ is a resource index of a PUCCH Format 3. It should be noted that, when the user equipment is configured with two antenna ports to transmit a PUCCH Format 3, or when the user equipment uses a space orthogonal resource transmit diversity SORTD (Space Orthogonal Resource Transmit Diversity) method to send a PUCCH Format 3, one PUCCH resource value in Table 1 corresponds to two PUCCH resources.

TABLE 1

| Value of TPC field | $n_{PUCCH}^{(3,p)}$ |
|---|---|
| '00' | First PUCCH resource value configured by a higher layer |
| '01' | Second PUCCH resource value configured by a higher layer |
| '10' | Third PUCCH resource value configured by a higher layer |
| '11' | Fourth PUCCH resource value configured by a higher layer |

If the uplink control information to be transmitted is only hybrid automatic repeat request acknowledgment information HARQ-ACK, the user equipment may obtain, according to a mapping between values of the TPC field and PUCCH resources shown in Table 2, a physical uplink control channel resource used to transmit the uplink control information, where $n_{PUCCH,i}^{(1)}$ is a resource index of a PUCCH Format 1b. One PUCCH resource value in Table 2 may correspond to two PUCCH Format 1b resources.

TABLE 2

| Value of TPC field | $n_{PUCCH,i}^{(1)}$ or $(n_{PUCCH,i}^{(1)}, n_{PUCCH,i+1}^{(1)})$ |
|---|---|
| '00' | First PUCCH resource value configured by a higher layer |
| '01' | Second PUCCH resource value configured by a higher layer |
| '10' | Third PUCCH resource value configured by a higher layer |
| '11' | Fourth PUCCH resource value configured by a higher layer |

It should be noted that, when the UCI to be transmitted is hybrid automatic repeat request acknowledgment information HARQ-ACK and the physical uplink control channel resources in the second resource group are PUCCH Format 1b resources, the physical uplink control channel resource finally used to transmit the hybrid automatic repeat request acknowledgment information may not be the physical uplink control channel resource indicated by the field. For example, the resource finally used to transmit the hybrid automatic repeat request acknowledgment information may be selected by using a channel selection method and according to the hybrid automatic repeat request acknowledgment information to be transmitted. For brevity, no repeated description is given herein any further.

Figure 3:
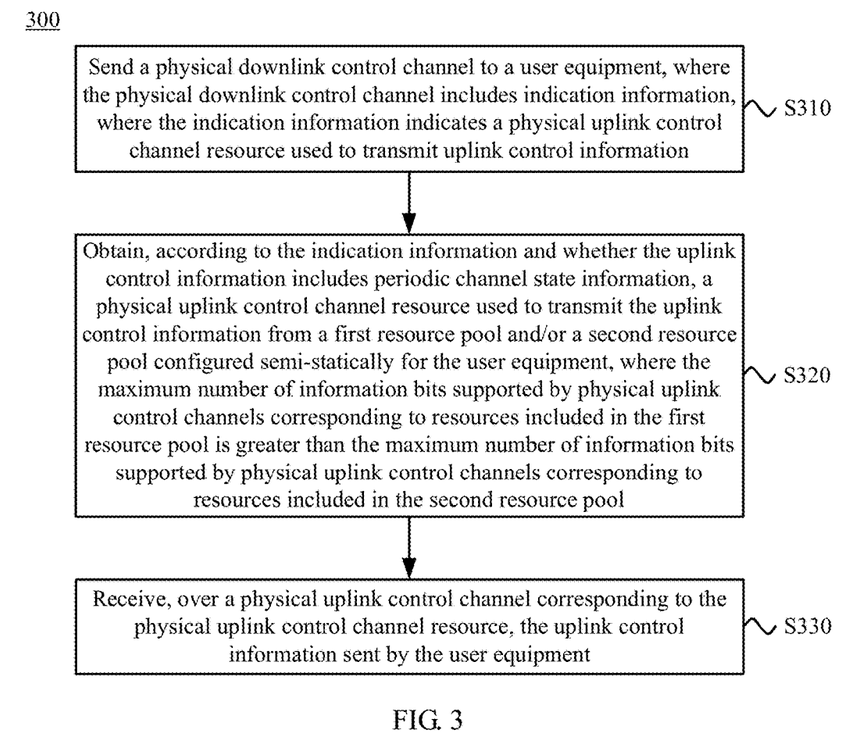
FIG. 3 is a schematic flowchart of a method for transmitting uplink control information according to another embodiment of the present application.
Figure 4:
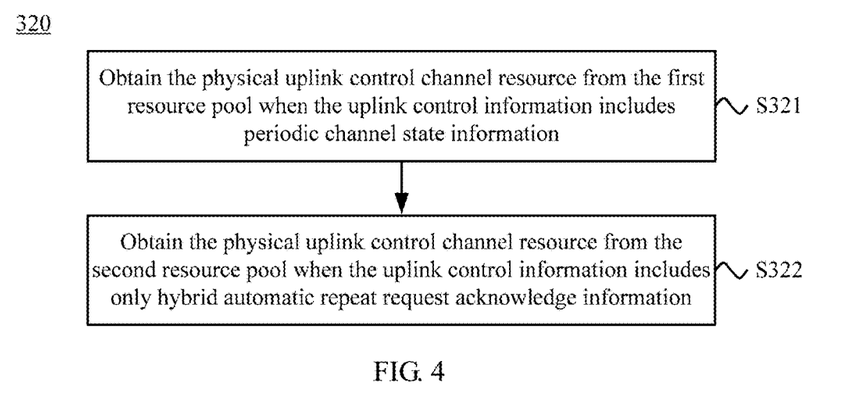
FIG. 4 is a schematic flowchart of a method for obtaining a physical uplink control channel resource according to another embodiment of the present application.

The foregoing has detailed the method for transmitting uplink control information from the perspective of a user equipment with reference to FIG. 1 and FIG. 2, and the following will describe the method for transmitting uplink control information from the perspective of a base station with reference to FIG. 3 and FIG. 4.

FIG. 3 is a schematic flowchart of a method 300 for transmitting uplink control information according to another embodiment of the present application. As shown in FIG. 3, the method 300 includes:

S310. Send a physical downlink control channel to a user equipment, where the physical downlink control channel includes indication information, where the indication information is used to indicate a physical uplink control channel resource used to transmit uplink control information.

S320. Obtain, according to the indication information and whether the uplink control information includes periodic channel state information, a physical uplink control channel resource used to transmit the uplink control information from a first resource group and/or a second resource group configured semi-statically for the user equipment, where a maximum number of information bits supported by physical uplink control channels corresponding to resources included in the first resource group is greater than a maximum number of information bits supported by physical uplink control channels corresponding to resources included in the second resource group.

S330. Receive, over a physical uplink control channel corresponding to the physical uplink control channel resource, the uplink control information sent by the user equipment.

Therefore, in the method for transmitting uplink control information in the embodiment of the present application, a physical uplink control channel resource used to transmit uplink control information is obtained from a semi-statically configured resource group according to indication information included in a physical downlink control channel and whether the uplink control information to be transmitted includes periodic channel state information. In this way, the uplink control information can be transmitted, the resource overhead caused by uplink control information transmission to the physical uplink control channel can be reduced, and the resource utilization can be improved.

In S310, the base station sends a physical downlink control channel to a user equipment, where the physical downlink control channel includes indication information, where the indication information is used to indicate a physical uplink control channel resource used to transmit uplink control information.

Optionally, a transmit power control TPC field of the PDCCH carries the indication information. Specifically, the TPC field in a downlink control information DCI format corresponding to the PDCCH carries the indication information. It should be understood that, in the embodiment of the present application, other fields in the DCI format may also be used to carry the indication information. The present application is not limited thereto.

In the embodiment of the present application, the uplink control information UCI to be transmitted or detected may include at least one of periodic channel state information CSI, hybrid automatic repeat request acknowledgment information HARQ-ACK, and a scheduling request (Scheduling Request, SR for short).

In S320, the base station obtains, according to the indication information included in the PDCCH sent to the user equipment and whether the uplink control information includes periodic channel state information, a physical uplink control channel resource used to transmit the uplink control information from a first resource group and/or a second resource group configured semi-statically for the user equipment.

Optionally, the resources included in the first resource group are physical uplink control channel format 3 resources; or the resources included in the second resource group are physical uplink control channel format 1b resources. That is, the first resource group may be formed by PUCCH resources of Format 3, and the second resource group may be formed by PUCCH resources of Format 1b. It should be understood that the first resource group and the second resource group may also be formed by PUCCH resources of other formats. The present application is not limited thereto.

In the embodiment of the present application, the base station may first determine, according to the uplink control information to be transmitted, a resource group that includes the physical uplink control channel indicated by a field in the DCI Format, where the field is used to indicate a physical uplink control channel resource; and then, according to the value of the field indicative of a physical uplink control channel, the base station may determine, in the corresponding resource group, the physical uplink control channel resource used to transmit the UCI. Specifically, the base station may determine, according to whether the uplink control information to be transmitted includes periodic channel state information, whether the physical uplink control channel resource used to transmit the uplink control information comes from the first resource group or the second resource group configured statistically for the user equipment.

Optionally, in the embodiment of the present application, in a method 320 for obtaining a physical uplink control channel resource illustrated in FIG. 4, the obtaining a physical uplink control channel resource used to transmit the uplink control information from a first resource group and/or a second resource group configured semi-statically for the user equipment includes S321: Obtain the physical uplink control channel resource from the first resource group when the uplink control information includes periodic channel state information.

For example, when the UCI to be transmitted includes only periodic CSI, or includes the periodic CSI and HARQ-ACK, or includes the periodic CSI, the HARQ-ACK, and an SR, the base station may obtain, from the first resource group, the PUCCH resource used to transmit the UCI. Specifically, for example, when the uplink control information UCI to be transmitted includes periodic channel state information CSI, the UCI may be transmitted by using a physical uplink control channel PUCCH of format 3.

Optionally, in the embodiment of the present application, in the method 320 for obtaining a physical uplink control channel resource illustrated in FIG. 4, the obtaining a physical uplink control channel resource used to transmit the uplink control information from a first resource group and/or a second resource group configured semi-statically for the user equipment includes: S322: Obtain the physical uplink control channel resource from the second resource group when the uplink control information includes only the hybrid automatic repeat request acknowledgment information.

That is, in an embodiment of the present application, when the UCI to be transmitted includes no periodic CSI, but includes only HARQ-ACK, the base station may obtain, from the second resource group, the PUCCH resource used to transmit the UCI. For example, when the uplink control information UCI to be transmitted includes only HARQ-ACK, the UCI may be transmitted by using a physical uplink control channel PUCCH of format 1b.

In the embodiment of the present application, both the PUCCH resources in the first resource group and the PUCCH resources in the second resource group may be configured by the base station for the user equipment semi-statically by using high layer signaling, and the PUCCH resources in the first resource group and the PUCCH resources in the second resource group may be used by multiple user equipments in a statistical multiplexing manner. That is, the base station may configure the same physical uplink control channel resource in the first resource group and/or the second resource group semi-statically for multiple user equipments by using high layer signaling. In the multiple user equipments, not all user equipments need to use the PUCCH resource at the same time. Therefore, the number of user equipments may be greater than the number of resources in the group, and the multiple user equipments can use the resources in the group in a statistical multiplexing manner. Therefore, in the embodiment of the present application, resources in the first resource group and/or the second resource group are configured semi-statically by using high layer signaling, and then the specific physical uplink control channel resource to be used by each user equipment is indicated dynamically by a PDCCH. In this way, multiple user equipments can use the semi-statically configured physical uplink control channel resources in a statistical multiplexing manner, thereby improving resource utilization.

In S330, the base station receives, over a physical uplink control channel corresponding to the physical uplink control channel resource, the uplink control information sent by the user equipment. For example, when the uplink control information to be detected is periodic CSI and hybrid automatic repeat request acknowledgment information HARQ-ACK, the base station obtains a resource index of a PUCCH Format 3; according to the resource index, the base station obtains an orthogonal sequence, a cyclic shift, and physical resource block (PRB) positions of the PUCCH Format 3, and then, according to the obtained orthogonal sequence, reference channel cyclic shift, and PRB positions, the base station detects the periodic CSI and the hybrid automatic repeat request acknowledgment information HARQ-ACK sent by the user equipment.

Therefore, in the method for transmitting uplink control information in the embodiment of the present application, a physical uplink control channel resource used to transmit uplink control information is obtained from a semi-statically configured resource group according to indication information included in a physical downlink control channel and whether the uplink control information to be transmitted includes periodic channel state information. In this way, the uplink control information can be transmitted, the resource overhead caused by uplink control information transmission to the physical uplink control channel can be reduced, and the resource utilization can be improved.

It should be understood that, in the embodiment of the present application, the interactions between the user equipment and the base station and relevant features and functions that are described from the perspective of a user equipment correspond to those described from the perspective of a base station, and, for brevity, no repeated description is given herein any further.

Further, it should be understood that, in various embodiments of the present application, the sequence numbers of the foregoing processes do not represent an order of execution, and the order of execution of the processes depends on its functions and inherent logic. The sequence numbers herein shall not constitute any limitation on the implementation processes of the embodiments of the present application.

The foregoing has described in detail the method for transmitting uplink control information in the embodiments of the present application with reference to FIG. 1 to FIG. 4, and the following will describe a user equipment and a base station in the embodiments of the present application with reference to FIG. 5 to FIG. 10.

Figure 5:
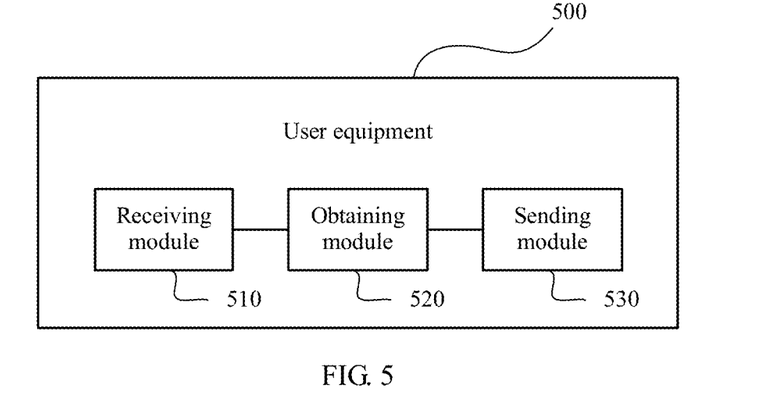
FIG. 5 is a schematic block diagram of a user equipment according to an embodiment of the present application.

FIG. 5 is a schematic block diagram of a user equipment 500 according to an embodiment of the present application. As shown in FIG. 5, the user equipment 500 includes:

a receiving module 510, configured to receive a physical downlink control channel sent by a base station, where the physical downlink control channel includes indication information, where the indication information is used to indicate a physical uplink control channel resource used to transmit uplink control information;

an obtaining module 520, configured to obtain, according to the indication information received by the receiving module 510 and whether the uplink control information includes periodic channel state information, from a semi-statically configured first resource group and/or second resource group, the physical uplink control channel resource used to transmit the uplink control information, where a maximum number of information bits supported by physical uplink control channels corresponding to resources included in the first resource group is greater than a maximum number of information bits supported by physical uplink control channels corresponding to resources included in the second resource group; and a sending module 530, configured to send the uplink control information to the base station over a physical uplink control channel corresponding to the physical uplink control channel resource obtained by the obtaining module 520.

The user equipment in the embodiment of the present application obtains, according to indication information included in a physical downlink control channel and whether uplink control information to be transmitted includes periodical channel state information, a physical uplink control channel resource used to transmit the uplink control information from a semi-statically configured resource group. In this way, the uplink control information can be transmitted, the resource overhead caused by uplink control information transmission to the physical uplink control channel can be reduced, and the resource utilization can be improved.

Figure 6:
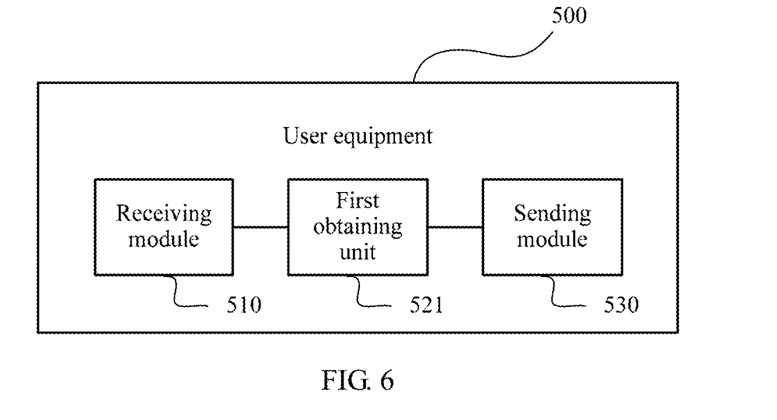
FIG. 6 is a schematic block diagram of a user equipment according to another embodiment of the present application.

In the embodiment of the present application, as shown in FIG. 6, optionally, the obtaining module 520 includes:

a first obtaining unit 521, configured to obtain the physical uplink control channel resource from the first resource group when the uplink control information includes periodic channel state information.

Figure 7:
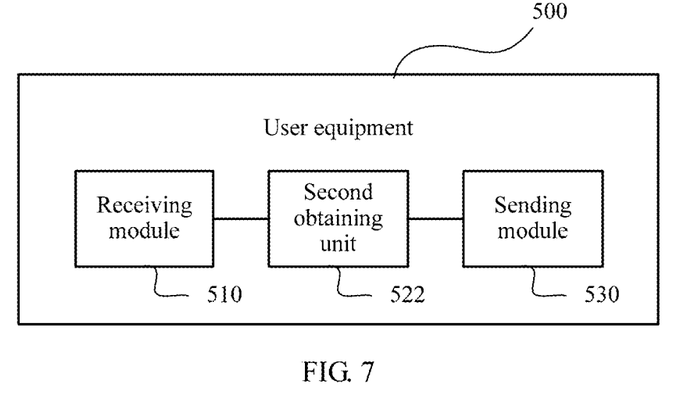
FIG. 7 is a schematic block diagram of a user equipment according to still another embodiment of the present application.

Optionally, as shown in FIG. 7, the obtaining module 520 includes:

a second obtaining unit 522, configured to obtain the physical uplink control channel resource from the second resource group when the uplink control information includes only hybrid automatic repeat request acknowledgment information.

In the embodiment of the present application, the obtaining module 520 is further configured to obtain, according to the indication information and whether the uplink control information includes periodic channel state information, the physical uplink control channel resource used to transmit the uplink control information from a semi-statically configured first resource group formed by physical uplink control channel format 3 resources and/or second resource group formed by physical uplink control channel format 1b resources.

In the embodiment of the present application, the receiving module 510 is further configured to receive the physical downlink control channel sent by the base station, where a transmit power control field of the physical downlink control channel carries the indication information.

The user equipment 500 in the embodiment of the present application may correspond to the user equipment in the method for transmitting uplink control information in the embodiments of the present application, and the foregoing and other operations and/or functions of the modules of the user equipment 500 implement the corresponding processes in the methods illustrated in FIG. 1 to FIG. 4. For brevity, no repeated description is given herein any further.

The user equipment in the embodiment of the present application obtains, according to indication information included in a physical downlink control channel and whether uplink control information to be transmitted includes periodic channel state information, a physical uplink control channel resource used to transmit the uplink control information from a semi-statically configured resource group. In this way, the uplink control information can be transmitted, the resource overhead caused by uplink control information transmission to the physical uplink control channel can be reduced, and the resource utilization can be improved.

Figure 8:
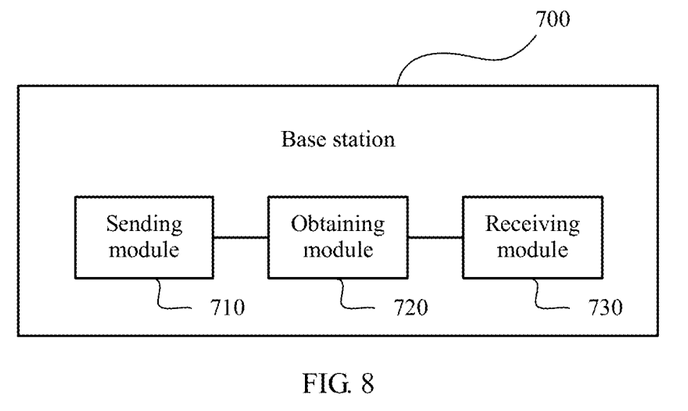
FIG. 8 is a schematic block diagram of a base station according to an embodiment of the present application.

FIG. 8 is a schematic block diagram of a base station 700 according to an embodiment of the present application. As shown in FIG. 8, the base station 700 includes:

a sending module 710, configured to send a physical downlink control channel to a user equipment, where the physical downlink control channel includes indication information, where the indication information is used to indicate a physical uplink control channel resource used to transmit uplink control information;

an obtaining module 720, configured to obtain, according to the indication information sent by the sending module 710 and whether the uplink control information includes periodic channel state information, the physical uplink control channel resource used to transmit the uplink control information from a first resource group and/or a second resource group configured semi-statically for the user equipment, where a maximum number of information bits supported by physical uplink control channels corresponding to resources included in the first resource group is greater than a maximum number of information bits supported by physical uplink control channels corresponding to resources included in the second resource group; and a receiving module 730, configured to receive, over a physical uplink control channel corresponding to the physical uplink control channel resource obtained by the obtaining module, the uplink control information sent by the user equipment 720.

The base station in the embodiment of the present application obtains, according to indication information included in a physical downlink control channel and whether uplink control information to be transmitted includes periodic channel state information, a physical uplink control channel resource used to transmit the uplink control information from a semi-statically configured resource group. In this way, the uplink control information can be transmitted, the resource overhead caused by uplink control information transmission to the physical uplink control channel can be reduced, and the resource utilization can be improved.

Figure 9:
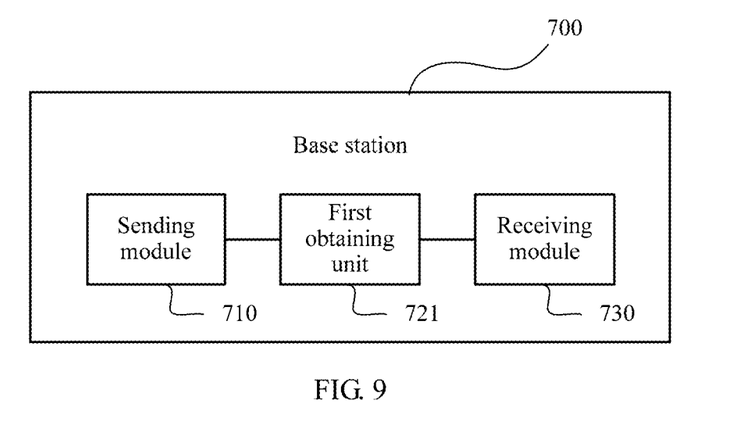
FIG. 9 is a schematic block diagram of a base station according to another embodiment of the present application.

In the embodiment of the present application, as shown in FIG. 9, optionally, the obtaining module 720 includes:

a first obtaining unit 721, configured to obtain the physical uplink control channel resource from the first resource group when the uplink control information includes periodic channel state information.

Figure 10:
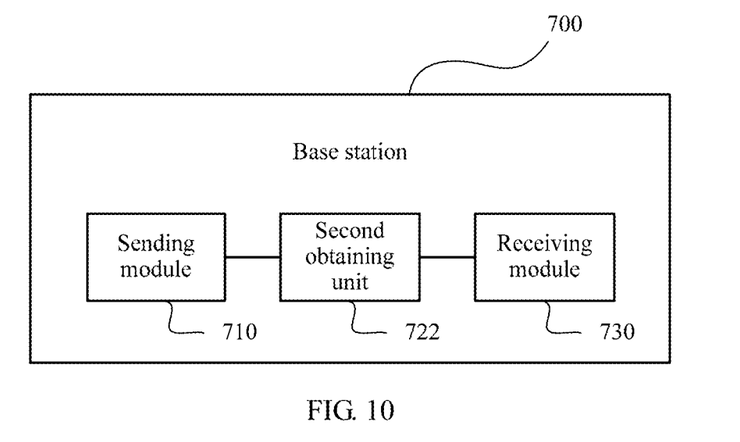
FIG. 10 is a schematic block diagram of a base station according to still another embodiment of the present application.

Optionally, as shown in FIG. 10, the obtaining module 720 includes:

a second obtaining unit 722, configured to obtain the physical uplink control channel resource from the second resource group when the uplink control information includes only hybrid automatic repeat request acknowledgment information.

Optionally, the obtaining module 720 is further configured to obtain, according to the indication information and whether the uplink control information includes periodic channel state information, the physical uplink control channel resource used to transmit the uplink control information from the first resource group formed by physical uplink control channel format 3 resources and/or second resource group formed by physical uplink control channel format 1b resources configured semi-statically for the user equipment.

In the embodiment of the present application, optionally, the sending module 710 is further configured to send the physical downlink control channel to the user equipment, where a transmit power control field of the physical downlink control channel carries the indication information.

The base station 700 in the embodiment of the present application may correspond to the base station in the method for transmitting uplink control information in the embodiments of the present application, and the foregoing and other operations and/or functions of the modules of the base station 700 implement the corresponding processes in the methods illustrated in FIG. 1 to FIG. 4. For brevity, no repeated description is given herein any further.

The base station in the embodiment of the present application obtains, according to indication information included in a physical downlink control channel and whether uplink control information to be transmitted includes periodic channel state information, a physical uplink control channel resource used to transmit the uplink control information from a semi-statically configured resource group. In this way, the uplink control information can be transmitted, the resource overhead caused by uplink control information transmission to the physical uplink control channel can be reduced, and the resource utilization can be improved.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in a form of software product. The computer software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present application, but are not intended to limit the protection scope of the present application. Any equivalent modification or replacement figured out by a person skilled in the art within the technical scope of the present application shall fall within the protection scope of the present application. Therefore, the protection scope of the present application shall be subject to the protection scope of the claims.

What is claimed is:

1. A method for transmitting uplink control information, the method comprising:

receiving a physical downlink control channel from a base station, wherein the physical downlink control channel includes indication information used to indicate a physical uplink control channel resource used to transmit uplink control information;

determining, according to the uplink control information, a resource group from semi-statically configured resource groups including a first resource group and a second resource group, wherein when the uplink control information includes periodic channel state information and hybrid automatic repeat request acknowledgment information, the determined resource group is the first resource group, and wherein when the uplink control information includes hybrid automatic repeat request acknowledgment information and a scheduling request but without periodic channel state information, the determined resource group is the second resource group, wherein a maximum number of information bits supported by physical uplink control channels corresponding to resources comprised in the first resource group is greater than a maximum number of information bits supported by physical uplink control channels corresponding to resources comprised in the second resource group;

determining, according to the indication information, the physical uplink control channel resource in the determined resource group; and sending the uplink control information to the base station over a physical uplink control channel corresponding to the physical uplink control channel resource.

2. The method according to claim 1, wherein a downlink control information format corresponding to the physical downlink control channel includes a field used to carry the indication information, and the field is a transmit power control field.

3. The method according to claim 1, wherein a downlink control information format corresponding to the physical downlink control channel includes a field used to carry the indication information, and the determining the physical uplink control channel resource in the determined resource group comprises:

determining, according to a value of the field used to carry the indication information, the physical uplink control channel resource in the determined resource group.

4. A method for transmitting uplink control information, the method comprising:

determining, according to uplink control information, a resource group from semi-statically configured resource groups including a first resource group and a second resource group, wherein when the uplink control information includes periodic channel state information and hybrid automatic repeat request acknowledgment information, the determined resource group is the first resource group, and wherein when the uplink control information includes hybrid automatic repeat request acknowledgment information and a scheduling request but without periodic channel state information, the determined resource group is the second resource group, wherein a maximum number of information bits supported by physical uplink control channels corresponding to resources comprised in the first resource group is greater than a maximum number of information bits supported by physical uplink control channels corresponding to resources comprised in the second resource group;

determining the physical uplink control channel resource in the determined resource group; and sending a physical downlink control channel to a user equipment, wherein the physical downlink control channel includes indication information indicating the physical uplink control channel resource in the determined resource group; and receiving, over a physical uplink control channel corresponding to the physical uplink control channel resource in the determined resource group, the uplink control information from the user equipment.

5. The method according to claim 4, wherein a downlink control information format corresponding to the physical downlink control channel includes a field used to carry the indication information, and the field is a transmit power control field.

6. The method according to claim 4, wherein a downlink control information format corresponding to the physical downlink control channel includes a field used to carry the indication information, and before sending the physical downlink control channel to the user equipment device, the method further comprises:

determining, according to the physical uplink control channel resource in the determined resource group, a value of the field used to carry the indication information.

7. A device, comprising:

a receiver, configured to receive a physical downlink control channel from a base station, wherein the physical downlink control channel includes indication information used to indicate an uplink control channel resource used to transmit uplink control information;

a processor, configured to:

determine a resource group from semi-statically configured resource groups including a first resource group and a second resource group according to the unlink control information, wherein when the uplink control information includes periodic channel state information and hybrid automatic repeat request acknowledgment information, the determined resource group is the first resource group, and wherein when the uplink control information includes hybrid automatic repeat request acknowledgment information and a scheduling request but without periodic channel state information, the determined resource group is the second resource group, wherein a maximum number of information bits supported by physical uplink control channels corresponding to resources comprised in the first resource group is greater than a maximum number of information bits supported by physical uplink control channels corresponding to resources comprised in the second resource group; and determine, according to the indication information, the physical uplink control channel resource in the determined resource group; and a transmitter, configured to send the uplink control information to the base station over a physical uplink control channel corresponding to the physical uplink control channel resource.

8. The device according to claim 7, wherein a downlink control information format corresponding to the physical downlink control channel includes a field used to carry the indication information, and the field is a transmit power control field.

9. A network device, comprising:

a transmitter configured to send a physical downlink control channel to a user equipment, wherein the physical downlink control channel comprises indication information indicating a physical uplink control channel resource used to transmit uplink control information;

a processor configured to determine, according to the indication information, a resource group from semi-statically configured resource groups including a first resource group and a second resource group, wherein when the uplink control information includes periodic channel state information and hybrid automatic repeat request acknowledgment information, the determined resource group is the first resource group, and wherein when the uplink control information includes hybrid automatic repeat request acknowledgment information and a scheduling request but without periodic channel state information, the determined resource group is the second resource group, wherein a maximum number of information bits supported by physical uplink control channels corresponding to resources comprised in the first resource group is greater than a maximum number of information bits supported by physical uplink control channels corresponding to resources comprised in the second resource group; and a receiver configured to receive, over a physical uplink control channel corresponding to the physical uplink control channel resource, the uplink control information from the user equipment.

10. The network device according to claim 9, wherein the transmitter is further configured to send the physical downlink control channel to the user equipment, wherein a transmit power control field of the physical downlink control channel carries the indication information.

* * * * *